United States Patent [19]
Saunders

[11] 3,755,280
[45] Aug. 28, 1973

[54] DRYING OF ACRYLAMIDE POLYMER GELS

[75] Inventor: Kenneth Worden Saunders, Darien, Conn.

[73] Assignee: American Cyanamid Company, Stamford, Conn.

[22] Filed: Mar. 5, 1971

[21] Appl. No.: 121,583

[52] U.S. Cl.......... 260/89.7 S, 210/54, 260/80.3 N
[51] Int. Cl............................ C08f 3/90, C08f 15/02
[58] Field of Search.................. 260/89.7 R, 89.7 S, 260/80.3 N, 45.7 S

[56] References Cited
UNITED STATES PATENTS
2,960,486  11/1960  Pye................................ 260/45.7 S
3,480,761  11/1969  Kolodny............................... 210/54

*Primary Examiner*—James A. Seidleck
*Assistant Examiner*—C. A. Henderson, Jr.
*Attorney*—Evans-Kahn

[57] ABSTRACT

The detoxification of monomeric acrylamide in aqueous polyacrylamide gels containing redox catalyst residuum is accomplished by the addition of less than 2/3 mol of a water-soluble non-toxic sulfite per mol of monomeric acrylamide present. The acrylamide is detoxified by conversion to polymer form.

4 Claims, No Drawings

DRYING OF ACRYLAMIDE POLYMER GELS

The present invention relates to aqueous acrylamide gels of acrylamide polymers prepared by use of a redox catalyst combination which contain toxic quantities of monomeric acrylamide, and to the drying of said gels with simultaneous decrease in the amount of the acrylamide present to non-toxic levels without formation of more than an acceptable amount of insoluble cross-linked polymer. Acrylamide polymers, as used herein, include the homopolymer of acrylamide and water-soluble copolymers of at least 10 mol percent acrylamide with at least one other vinyl organic compound which forms a linear polymer when copolymerized therewith.

Water-soluble acrylamide polymers are prepared industrially by forming an aqueous solution containing 5%–15% by weight of acrylamide (and if desired a suitable water-soluble vinyl compound copolymerized therewith), adding a redox polymerization catalyst combination (typically a sulfite-oxidizing salt combination), and allowing the solution to stand at appropriate temperature. The product is an aqueous solution containing at least 50% water by weight and roughly 5%–15% by weight of the polymer. Because it is normally a viscous or rubbery mass it is hereinafter termed a gel.

In the polymerization process the amount of sulfite or equivalent salt must be maintained at a carefully controlled level. Too much of the sulfite or equivalent salt results in a gel which contains substantially no monomeric acrylamide, but the molecular weight of the polymer is unacceptably low. Too little of the salt results in a polymer of usefully high molecular weight, but the gel tends to contain a dangerous amount of acrylamide monomer. As a result present-day processes for the manufacture of acrylamide polymers require that a compromise be struck between molecular weight and residual (i.e., monomeric) acrylamide. To achieve a desirably high molecular weight it is typically necessary to accept the presence of 0.5%–5% of acrylamide monomer in the gel based on the weight of acrylamide initially taken, and as a result all of the sulfite is consumed.

A further difficulty in the process is that the gel is very difficult to dry to grindable state, i.e., to a water content of less than about 15% by weight. When the gel is dried at low temperature, all of the product is soluble in water. However, when the gel is dried at temperatures above about 70° C. (i.e., above about 160° F.) a proportion of the polymer chains cross-link, as a result of which at least a part of the acrylamide polymer is converted to water-insoluble form and the effectiveness of the polymer as a flocculant decreases. Acrylamide polymers which contain more than a very small amount of insoluble polymeric material are unsatisfactory for most purposes, and any substantial decrease in the efficiency of the flocculant tends to render use of the flocculant uneconomic.

Most acrylamide polymers are non-toxic, but monomeric acrylamide itself is toxic. Water-soluble acrylamide polymers find use as flocculants for suspended solids in water and as strengthening agents for paper. To ensure safety when these polymers are used for these purposes, the Public Health Service has set 0.05% as the maximum permissible amount of monomeric acrylamide which may be present in any acrylamide polymer used for the clarification of drinking water. The limit for monomeric acrylamide in acrylamide polymers used in the manufacture of paper is 0.2%, and a "Poison" label must be affixed to containers of acrylamide polymers which contain monomeric acrylamide in excess of 0.5% by weight.

It is not practical to remove residual monomeric acrylamide from acrylamide polymers. To meet the toxicity standards, polymerization of the acrylamide content of the reaction mixture therefor must be driven to at least 99% completion. Heretofore the only method of achieving this high yield has been to maintain the aforementioned gel at reaction temperature until the monomeric content of the gel has fallen to an acceptably low level. This, however, has required from several hours to several days, depending on the molecular weight of the polymer and amount of residual monomeric acrylamide in the gel. Heating of the gel to shorten this time to an acceptable duration causes formation of an unacceptable amount of insoluble matter.

U. S. Pat. No. 2,960,486 issued to David J. Pye on Nov. 15, 1960, discloses that certain water-soluble non-toxic sulfites are detoxifying agents for monomeric acrylamide in acrylamide polymer gels. According to the patent, however, the sulfites, when employed for this purpose, are added in the amount of at least 1 mol per mol of monomeric acrylamide present so that evidently in the process of the patent the sulfite produces its detoxifying action by formation of an addition product with the acrylamide according to the theoretical equation:

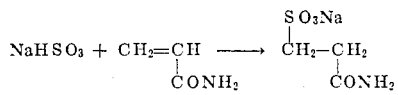

The discovery has now been made that the water-soluble non-toxic sulfites produce a detoxifying effect when added in a far smaller amount to acrylamide polymer gels produced by the action of a redox catalyst combination containing a persulfate, and do this by a different mechanism. I have found that very satisfactory conversion of acrylamide monomer to non-toxic form is achieved in such a gel by as little as 0.014 mol of sodium sulfite per mol of acrylamide monomer present, and I have also found that it is unnecessary for the amount of sodium sulfite to be in excess of about 2/3 mol per mol of acrylamide monomer present. The present invention thus permits a reduction of over 99% in the minimum amount of sulfite heretofore believed needed to provide non-toxic acrylamide polymers. I have still further found that these virtually trace amounts of sulfite are substantially as effective as larger amounts in protecting the gel against thermal degradation (i.e., the formation of insoluble matter) when it is dried at elevated temperature.

I have still further and most surprisingly found that the sulfite continues to inhibit formation of insoluble matter during the drying step even when added in virtually trace amount and that in fact such virtually trace amount is substantially as effective in preventing formation of insoluble matter during the drying as the much larger amounts heretofore believed necessary.

The present invention thus results from the very surprising discovery that while substantially all of the sulfite component of the redox catalyst is consumed when an acrylamide polymer is formed by the action of a sulfite oxidizing salt redox catalyst, a substantial amount of the oxidizing salt component remains, and that this amount of oxidizing salt is sufficient to cause detoxification of the monomer when less than 2/3 mol of sulfite is added per mol of acrylamide present, followed by drying the gel at room or at elevated temperature. Detoxification of the acrylamide proceeds as the gel is dried. As a result, it becomes possible to detoxify residual acrylamide in aqueous polyacrylamide gels by the addition of only a fraction of the amount of added sulfite heretofore believed required. In the process of the present invention the added sulfite detoxifies the monomeric acrylamide by polymerization according to the theoretical equation:

In the process, the added sulfite and the residual oxidizing salt act as redox catalyst for the polymerization. For this purpose no more than 2/3 mol of sulfite is needed per mol of acrylamide monomer in the gel, and a much smaller amount in most instances is effective. The minimum effective amount for the purpose has not been ascertained. This probably varies from instance to instance but in any instance can be found by laboratory trial, as shown in the examples.

In practice, I prefer to add the sulfite in amount sufficient to supply about 0.01 to 0.1 mol of sulfite ($SO_3^{--}$) per mol of acrylamide monomer present to the gel to be detoxified. Within this range a very large saving in the sulfite compound required for substantial detoxification is effected, and the dangers of under-use of the sulfite compound are avoided. Moreover, the amount of residual sulfite in the final product is correspondingly decreased, and this is important because acrylamide polymers are used in the commercial treatment of drinking water, and the physiological effects of the sulfite anion have not been completely determined.

The proper amount of sulfite which is needed to produce substantially complete detoxification of the gel in any one instance depends upon the temperature of the gel, on the pH of the gel, on the solids content of the gel, and whether any residual trace of polymerization inhibitor is present. As stated, the amount of sulfite to be added in any instance is most conveniently determined by laboratory trial.

The sulfite may be incorporated in the gel as a powder, in which event the gel should be held until the powder has dissolved and become uniformly distributed throughout the gel. Most conveniently, however, the sulfite is incorporated into the gel as an aqueous solution, as in this event the sulfite distributes itself through the gel quite rapidly. When the sulfite is added as a 1% aqueous solution and is throughly milled into the gel (as by the action of a cog transfer pump) the sulfite becomes uniformly distributed throughout the gel in 1 minute.

The sulfite produces its detoxifying action at room temperature, so that no further step is needed to gain the benefit of the present invention. However, the action of the sulfite is slow at this temperature. In commercial practice it is customary to subject acrylamide polymer gels to heating to convert them to dry, friable or grindable state. The sulfite performs its detoxifying effect very rapidly at the drying temperatures customarily employed, and is therefore most conveniently incorporated into the gel as it is pumped to the drying apparatus. A suitable drying procedure at elevated temperature is disclosed in Zonis et al. U. S. application, Ser. No. 41,807 filed on June 1, 1970 now U. S. Pat. No. 3,634,944.

The sulfites used in the present invention are the water-soluble non-toxic sulfites. These include the ammonium, potassium, sodium, calcium, and magnesium sulfites, bisulfites and metabisulfites (also termed pyrosulfites), the anions of which have the respective formulae $SO_3^{--}$ and $S_2O_5^{--}$. Sodium sulfite, bisulfite and metabisulfite are preferred because of their low toxicity and ready availability and the excellent results which they afford.

The invention is further illustrated by the examples. These examples are preferred embodiments of the invention and are not to be construed as limitations thereon.

EXAMPLE 1

The following illustrates the comparative effectiveness of a sodium sulfite in larger than molar and in fractional molar amount as detoxifying agent for acrylamide monomer in polyacrylamide gels containing a catalytically effective residual amount of the oxidizing salt component of a redox catalyst combination.

The polyacrylamide gels used are composed of about 90% water by weight, 8%-9% of polyacrylamide having a molecular weight of about five million, about 0.1 to 1% of monomeric acrylamide, and residual sodium persulfate from the sodium sulfite-sodium persulfate redox catalyst combination, all of the sodium sulfite having been consumed in the polymerization.

The following table shows the results which are obtained in continuous pilot plant production when 20% sodium bisulfite solution is mixed into the gel and the gel is dried by extruding the gel as a plurality of cords about one-fourth inch in diameter upon a travelling belt having a polyfluoroethylene surface, contacting the cords upon the belt with air at 330° F. until the gel has a water content of about 70% by weight and has a non-adhesive skin, and then contacting the cords with air at 160° F. until the cords are apparently dry and are hard and friable. The gel is thus dried at a temperature between about 212° F. and 160° F. The general procedure of said Zonis et al. application is followed.

Into the gel as it continuously flows to the extruder is milled sufficient of a 20% aqueous sodium bisulfite solution (prepared by addition of sodium metabisulfite to water) to provide the mols of sulfite shown in the table below. Representative samples of the respective portions of dried gel are dissolved in water and the solutions are analyzed to determine the amount of acrylamide monomer and insoluble material present in the dried gel samples.

Results are as follows:

|  | Percent, acrylamide monomer [2] | | | |
|---|---|---|---|---|
| Mols [1] sulfite added | In gel before drying | In prod. after drying | Percent, AM [3] detoxified | Percent, insol. in prod. |
| Run No.: | | | | |
| 1 — 1.5 | 1.0 | 0.005 | 99 | 0.03 |
| 2 — 0.67 | 2.2 | 0.10 | 96 | 0.12 |
| 3 — 0.11 | 3.12 | 0.04 | 99 | 0.56 |
| 4 — 0.014 | 2.98 | 0.11 | 96 | 0.08 |

[1] Mols $SO_3^-$ per mol of acrylamide in gel.
[2] Based on dry weight of polymers.
[3] Acrylamide.

EXAMPLE 2

The following illustrates the effect of the addition of fractional molar amounts of sodium sulfite in the continuous industrial drying of polyacrylamide gel at elevated temperature.

The procedure of Example 1 is repeated.

In run 9 the starting gel contains a large amount of monomeric acrylamide owing to an accidental decrease in the amount of sodium sulfite in the redox catalyst combination used for preparation of the gel.

Results are as follows:

| Run No.: | Mols sulfite added [1] | Percent, monomeric acrylamide [2] | | Percent, AM detoxified | Percent, insol. in dry prod. | Visc. (cp.) [3] | |
|---|---|---|---|---|---|---|---|
| | | In gel before drying | In dry product | | | Before drying | After drying |
| 1 | 0.34 | 2.34 | 0.30 | 92 | 0.15 | 5.7 | 5.4 |
| 2 | 0.22 | 1.65 | 0.03 | 98 | 0.24 | 4.8 | 4.9 |
| 3 | 0.21 | 1.70 | 0.21 | 88 | <0.05 | 6.5 | 4.7 |
| 4 | 0.21 | 1.70 | 0.21 | 88 | <0.05 | 5.5 | 4.7 |
| 5 | 0.15 | 2.45 | 0.28 | 89 | 0.26 | 6.1 | 4.9 |
| 6 | 0.11 | 3.12 | 0.04 | 99 | 0.56 | 4.9 | 4.8 |
| 7 | 0.11 | 3.12 | 0.03 | 99 | 0.47 | 4.9 | 5.0 |
| 8 | 0.06 | 5.72 | 0.31 | 95 | <0.05 | 5.1 | 4.7 |
| 9 | 0.016 | 21.8 | 0.22 | 99 | 1.32 | 5.2 | 4.4 |
| 10 | 0.014 | 2.98 | 0.11 | 96 | 0.08 | 5.7 | 5.0 |
| [11] | None | 2.20 | | | 0.95 | 5.7 | 3.2 |

[1] Per mol of acrylamide monomer in gel.
[2] Based on weight of polymer.
[3] Of 0.1% by weight solution of polymer in 1 N NaCl at 20° C.

Run 11 is the control. It shows that when no sulfite is post-added, the polymer undergoes severe degradation as it dries, the viscosity of the polymer falling by 44% (to 3.2 cp.) so that the product is not of commercial value.

Run 1 shows that about 1/3 mol of sulfite per mol of acrylamide monomer is effective in converting 92% of the monomeric acrylamide to non-toxic form.

Run 9 shows that about 1/70 mol of sulfite per mol of acrylamide monomer is effective in detoxifying over 95% of the monomeric acrylamide, even when the amount of acrylamide present is very large.

The results further show that polyacrylamide gels dried according to the present invention at elevated temperature contain a very small amount of insoluble material, and that the molecular weight of the polymer is no more than negligibly decreased in the process.

From previous experience it is known that amount of insolubles would not be substantially decreased even by a major increase in the amount of sulfite added.

I claim:

1. A process for detoxifying acrylamide monomer in an aqueous acrylamide polymer gel containing a catalytically effective amount of the oxidizing salt component of a redox catalyst combination and containing no sulfite, which consists essentially in uniformly incorporating into said gel an effective detoxifying amount, less than 2/3 mol per mol of said monomer, of a water-soluble non-toxic sulfite, and drying said gel to hard, friable state at a temperature below its thermal degradation point.

2. A process according to claim 1 wherein the amount of sulfite which is incorporated in said gel is between 0.01 and 0.1 mol per mol of acrylamide monomer in said gel.

3. A process according to claim 1 wherein the sulfite which is incorporated in said gel is sodium bisulfite.

4. A process according to claim 1 wherein the gel is dried at a temperature between about 160° F. and 212° F.

* * * * *